United States Patent
Yu et al.

(10) Patent No.: US 9,374,615 B2
(45) Date of Patent: Jun. 21, 2016

(54) PARALLEL RATE CONTROL FOR DIGITAL VIDEO ENCODER WITH MULTI-PROCESSOR ARCHITECTURE AND PICTURE-BASED LOOK-AHEAD WINDOW

(75) Inventors: Guoyao Yu, Portland, OR (US); Mayer D. Schwartz, Portland, OR (US); Charles H. Van Dusen, Beaverton, OR (US); Peter Borgwardt, Portland, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 725 days.

(21) Appl. No.: 13/253,937

(22) Filed: Oct. 5, 2011

(65) Prior Publication Data

US 2012/0027082 A1 Feb. 2, 2012

Related U.S. Application Data

(63) Continuation of application No. 11/269,428, filed on Nov. 7, 2005, now Pat. No. 8,054,880.

(60) Provisional application No. 60/635,116, filed on Dec. 10, 2004.

(51) Int. Cl.
*H04B 1/66* (2006.01)
*H04N 21/44* (2011.01)
(Continued)

(52) U.S. Cl.
CPC ....... *H04N 21/44004* (2013.01); *H04N 19/115* (2014.11); *H04N 19/124* (2014.11);
(Continued)

(58) Field of Classification Search
CPC ............ H04N 21/23406; H04N 19/14; H04N 19/152; H04N 19/176; H04N 19/115; H04N 19/124; H04N 19/172; H04N 19/15; H04N 21/44004; H04N 19/194; H04N 19/436
USPC ............................ 370/535; 375/240; 382/232
See application file for complete search history.

(56) References Cited

U.S. PATENT DOCUMENTS 5,764,293 A * 6/1998 Uz et al. ............... 348/390.1
6,044,396 A * 3/2000 Adams ..................... 725/95
(Continued)

FOREIGN PATENT DOCUMENTS

JP     06-086269     3/1994
JP     06-205399     7/1994
(Continued)

OTHER PUBLICATIONS

Office Action, Korean App. No. 10-2007-7015775, Jun. 11, 2012.
(Continued)

*Primary Examiner* — Amara Abdi
(74) *Attorney, Agent, or Firm* — Stewart M. Wiener

(57) ABSTRACT

A method of operating a multi-processor video encoder by determining a target size corresponding to a preferred number of bits to be used when creating an encoded version of a picture in a group of sequential pictures making up a video sequence. The method includes the steps of calculating a first degree of fullness of a coded picture buffer at a first time, operating on the first degree of fullness to return an estimated second degree of fullness of the coded picture buffer at a second time, and operating on the second degree of fullness to return an initial target sized for the picture. The first time corresponds to the most recent time an accurate degree of fullness of the coded picture buffer can be calculated and the second time occurs after the first time.

5 Claims, 6 Drawing Sheets

(51) Int. Cl.
  *H04N 21/234* (2011.01)
  *H04N 19/176* (2014.01)
  *H04N 19/172* (2014.01)
  *H04N 19/15* (2014.01)
  *H04N 19/115* (2014.01)
  *H04N 19/124* (2014.01)
  *H04N 19/14* (2014.01)
  *H04N 19/152* (2014.01)
  *H04N 19/194* (2014.01)
  *H04N 19/436* (2014.01)

(52) U.S. Cl.
  CPC .............. *H04N 19/14* (2014.11); *H04N 19/15* (2014.11); *H04N 19/152* (2014.11); *H04N 19/172* (2014.11); *H04N 19/176* (2014.11); *H04N 19/194* (2014.11); *H04N 19/436* (2014.11); *H04N 21/23406* (2013.01)

(56) References Cited

U.S. PATENT DOCUMENTS 6,055,270 A * 4/2000 Ozkan et al. ............. 375/240.03
6,614,935 B2 * 9/2003 Rajagopalan et al. ........ 382/232

FOREIGN PATENT DOCUMENTS

| JP | 09-214979 | 8/1997 |
| JP | 11-196410 | 7/1999 |
| JP | 2002-232882 A | 8/2002 |

OTHER PUBLICATIONS

Office Action, Japanese. App. No. 2012-100459, Feb. 28, 2013.

* cited by examiner

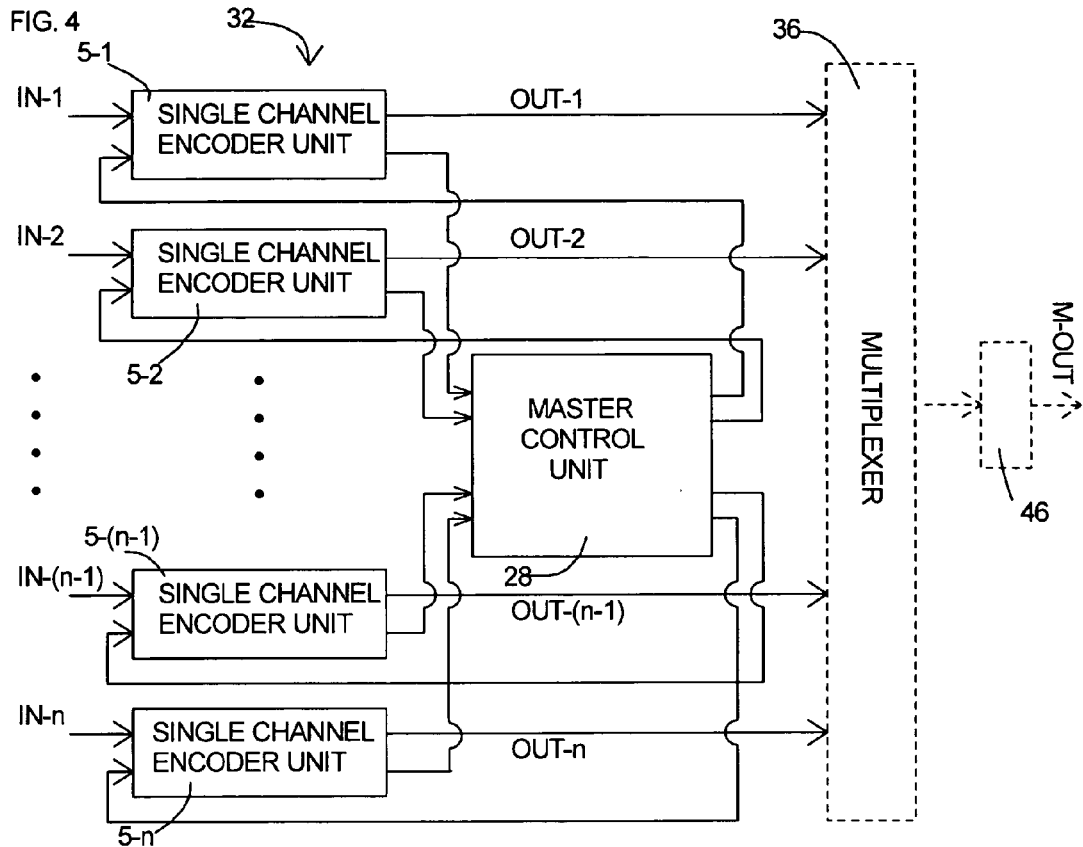
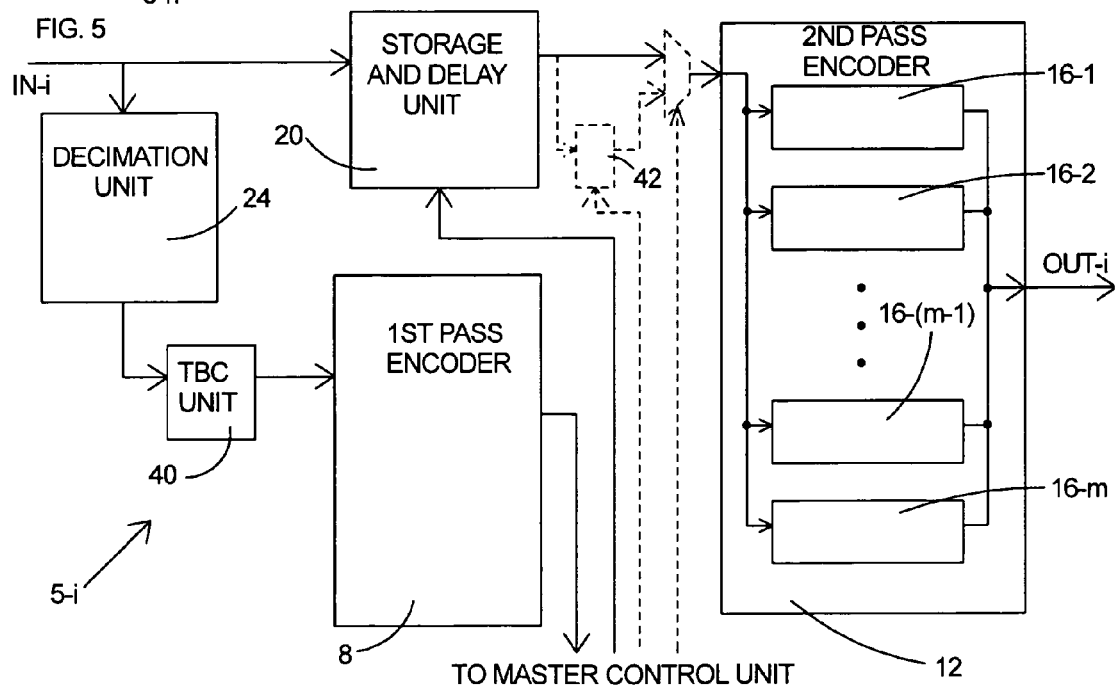

PARALLEL RATE CONTROL FOR DIGITAL VIDEO ENCODER WITH MULTI-PROCESSOR ARCHITECTURE AND PICTURE-BASED LOOK-AHEAD WINDOW

CROSS-REFERENCE TO RELATED APPLICATION

Subject matter disclosed in this application might be considered to be related to the subject matter disclosed in U.S. patent application Ser. No. 10/316,483 filed Dec. 10, 2002, the entire disclosure of which is hereby incorporated by reference herein for all purposes.

This application claims benefit of Provisional Application No. 60/635,116 filed Dec. 10, 2004, the entire disclosure of which is hereby incorporated by reference herein.

BACKGROUND

Although the H.264 standard is specifically referenced below, the ideas and principles described are independent of a particular video coding standard and are equally valid for MPEG-2, ISO MPEG-4 part 10, AVC, or the emerging SMPTE VC-1 standard.

There is a constant demand in the video compression industry to continually increase the efficiency of video encoding, particularly in real-time applications such as television broadcasting, video conferencing, etc. The recent ITU-T H.264 standard is designed to meet this demand for increased efficiency at the cost of a corresponding increase in algorithm complexity. For instance, an H.264 video stream requires approximately half of the bit rate of an MPEG-2 video stream to achieve the same visual quality while the complexity of implementation of an H.264 encoder is an order of magnitude greater than for an MPEG-2 encoder.

In a typical application, an uncompressed video stream, made up of a sequence of pictures, is received by a video encoder and the video encoder creates an encoded version of each picture in the video sequence, thereby creating an encoded version of the uncompressed video stream. The encoded video stream is then transmitted to a video decoder over a constant bit rate (CBR) channel and the video decoder decodes the encoded video stream, thereby generating an uncompressed video stream that is ideally visually indistinguishable from the original uncompressed video stream.

The more bits that the encoder uses to create the compressed version of a picture of the video sequence, the longer it will take to transmit the compressed version of the picture over the CBR channel. Within the decoder, when encoded pictures are received, they are loaded into a decoder buffer to await decoding. The bits of an encoded picture are loaded into the decoder buffer sequentially as they arrive, but at the picture's decode time, all of the bits are removed from the buffer simultaneously.

In the simplified model above, over a particular period, the decoder buffer will receive a constant number of bits corresponding to a variable number of pictures. Over the same period, the decoder will remove a constant number of pictures from the decoder buffer, corresponding to a variable number of bits. If the encoder is transmitting many relatively large pictures during the period, then the number of pictures received during the period will be relatively small. This can cause the decoder buffer to empty, or underflow, as the decoder buffer may remove pictures at a faster rate than it is receiving new pictures. Conversely, if the decoder buffer is receiving many relatively small pictures during the period, then the number of pictures received during the period will be relatively large. This can cause the decoder buffer to overflow, as the decoder buffer may receive new pictures at a faster rate than it is removing pictures. Both underflow and overflow may cause a disruption in the uncompressed video stream generated by the decoder and therefore neither underflow nor overflow should be allowed to occur. It is therefore important that a video encoder considers the fullness of a downstream decoder's buffer while generating the encoded video stream. However, the decoder cannot communicate with the encoder and therefore the actual fullness of the decoder buffer is not available to the encoder. To this end, compressed video standards, such as H.264, define a hypothetical reference decoder (HRD) and the video encoder maintains a mathematical model of the HRD's coded picture buffer, generally called a virtual buffer. If the virtual buffer never overflow/underflows, then the decoder buffer will conversely never underflow/overflow. The encoder can then regulate the encoded video stream to avoid underflow or overflow of the downstream decoder buffer by sizing the encoded versions of the pictures of the video stream to maintain fullness of the virtual buffer at a safe level To meet the computing requirements of newer, more computationally complex, video coding standards, multi-processor designs which use parallel processing can be implemented. For example a single processor could be assigned to encode I and P pictures, and the remaining processors are assigned to encode B pictures. More processors are used in the encoding of B pictures as more computing cycles are required to encode a B picture than to encode an I or P picture and there are generally significantly more B pictures in a given video stream than I and P pictures. For simplicity, it is assumed for this example that B pictures are not used as reference pictures, although the H.264 standard allows otherwise. In the following group of pictures (GOP) structure description, the subscript indicates decode (encode) order:

$I_0 \, B_2 \, B_3 \, P_1 \, B_5 \, B_6 \, P_4 \, B_8 \, B_9 \, P_7 \, B_{11} \, B_{12} \, P_{10} \, B_{14} \, B_{15} \, I_{13} \ldots$ Table 1 shows, in simplified form, how the pictures of the above GOP could be distributed in a multi-processor encoder. In Table 1, each time slot u represents the real-time display duration for three pictures, so, if the input was NTSC video, each time slot would be 3003/30000 seconds in duration.

TABLE 1

| Processor | u = 1 | u = 2 | u = 3 | u = 4 | u = 5 | u = 6 | u = 7 | u = 8 |
|---|---|---|---|---|---|---|---|---|
| 1 | $I_0$ | $P_1$ | $P_4$ | $P_7$ | $P_{10}$ | $I_{13}$ | $P_{16}$ | $P_{19}$ |
| 2 | | | $B_2$ | $B_2$ | $B_8$ | $B_8$ | $B_{14}$ | $B_{14}$ |
| 3 | | | $B_3$ | $B_3$ | $B_9$ | $B_9$ | $B_{15}$ | $B_{15}$ |
| 4 | | | | $B_5$ | $B_5$ | $B_{11}$ | $B_{11}$ | $B_{17}$ |
| 5 | | | | $B_6$ | $B_6$ | $B_{12}$ | $B_{12}$ | $B_{18}$ |
| encoded | | | | $I_0$ | $B_2$ | $B_5$ | $B_8$ | $B_{11}$ |
| pictures | | | | $P_1$ | $B_3$ | $B_6$ | $B_9$ | $B_{12}$ |
| available | | | | | $P_4$ | $P_7$ | $P_{10}$ | $I_{13}$ |

As shown in Table 1, processor 1 is used to encode all reference pictures, including I and P pictures. Processors 2, 3, 4 and 5 are used to encode B pictures. Thus, for this illustrative example, there is a pipeline delay of at least two time slots after the processing pipeline is initially filled. Note that each B picture is assigned two time slots while each I or P picture is assigned one time slot. As soon as the encoding of all necessary reference pictures is completed, the encoding of the referring B pictures begins in parallel. For example, the encoding of pictures $B_5$ and $B_6$ begins in parallel in processors 4 and 5 respectively as soon as the encoding of picture $P_4$ is finished. Processor 1 keeps encoding I or P pictures regardless of activities in the other processors. The last row in Table 1 shows the encoded pictures as they become available in encode order. Table 1 is a simplified example. In practice, more activities are considered, such as receiving uncompressed pictures, encoding pictures, sending reconstructed pictures, receiving reconstructed pictures, necessary delay, etc. However, since these details are not essential to the present example, they have been omitted.

An important task of a video encoder is to find an appropriate balance between the desired image quality of the encoded video stream, the bit rate limitations of the channel over which the video stream is being transmitted, and maintaining a safe level of fullness in the decoder buffer. A rate control algorithm in the encoder uses the fullness of the virtual buffer and the relative complexity of individual pictures to calculate an appropriate allocation of bits to each picture of the video stream. In sequential encoding, the rate control algorithm checks the virtual buffer fullness upon the completion of the encoding of each picture before the encoding of the subsequent picture begins. In the case of the pipelined parallel encoder, the fullness of the virtual buffer is not immediately available to the rate control algorithm due to the pipeline delay induced by the simultaneous and non-sequential encoding of multiple pictures. Because all the processors in the pipelined parallel encoder operate independently of one another, the concept of "subsequent picture" must be replaced by "subsequent pictures after some fixed delay" and during that delay several additional pictures will be encoded, thus altering the fullness of the virtual buffer. For example, according to sequential encoding order, after completing the encoding of picture $B_6$, the rate control algorithm checks the virtual buffer fullness before encoding picture $P_7$. This is impossible for the parallel encoder described above, as the encoding of pictures $B_6$ and $P_7$ begins simultaneously, and the encoding of picture $P_7$ is completed before the encoding of picture $B_6$ is finished. Therefore the rate control algorithm will need to predict the fullness of the virtual buffer at some point in the future rather than simply checking the current value. A related issue with a parallel encoder that complicates the requirements for the rate control algorithm is the potential need for stuff bits. An encoder needs to insert stuff bits into the encoded video stream when the virtual buffer is empty or is in danger of becoming so. A sequential encoder's rate control algorithm knows exactly how many bits to stuff as soon as a picture is finished encoding. However a parallel encoder's rate control algorithm will need to calculate the needed number of stuff bits in a different way because of the unavailability of an accurate measure of the virtual buffer's true fullness due to the aforementioned pipeline delay. Another requirement of a parallel rate control algorithm is the ability to determine several bit rate targets for several pictures simultaneously. As shown in Table 1, at the beginning of time slot 4, for example, a parallel rate control algorithm needs to determine bit rate targets for pictures $P_7$, $B_5$, and $B_6$.

It is widely recognized in the video compression industry that dual-pass encoding provides higher coding efficiency than single pass encoding. However the increase in efficiency would not outweigh the comparatively large cost of using two pipelined parallel encoders together in a dual pass architecture and so dual-pass encoding is not always a practical solution.

Referring to FIG. 1, a sequential dual pass encoder 1 receives an unencoded video stream as input and transmits an encoded single program transport stream (SPTS) as an output (which may be transmitted at either a variable bit rate (VBR) or a constant bit rate (CBR), depending on the application) and includes a 1st pass encoder 2, a 2nd pass encoder 3 and a storage and delay unit 4. The 1st pass encoder 2 is relatively simple compared to the 2nd pass encoder 3. For instance, the input to the 1st pass encoder 2 may be downsampled and compared to the input to the 2nd pass encoder 3. The 1st pass encoder 2 and the storage and delay unit 4 receive an uncompressed video stream as input. The storage and delay unit 4 buffers the video stream while the simple 1st pass encoder 2 calculates complexity information for each picture in the video stream. The pictures of the video stream and the corresponding complexity statistics are then transmitted to the 2nd pass encoder. The 2nd pass encoder 3 utilizes the complexity information generated by the 1st pass encoder 2 to create an encoded version of the input video stream. By using a simple 1st pass encoder 2 instead of a more sophisticated encoder at the input, the implementation cost is reduced close to that of a single-pass sophisticated encoder. However, because of the implementation differences between the 1st and 2nd pass encoder, the complexity information generated by the 1st pass encoder 2 is not exactly the information desired by the relatively sophisticated 2nd pass encoder 3.

Despite this deficiency, a correlation between picture complexity estimation in 1st pass encoding and picture complexity estimation in 2nd pass encoding exists. In most cases a picture or a group of pictures (GOP) that is relatively complicated/simple for the 1st pass encoder 2 is also relatively complicated/simple for the 2nd pass encoder 3. The complexity statistics still indicate important relationships among pictures and macro-blocks (MBs), with the error being tolerable. Therefore compared to single-pass sophisticated coding, the dual-pass encoder is superior in video coding efficiency with only a slightly higher implementation cost.

SUMMARY OF THE INVENTION

In accordance with a first aspect of the invention there is provided a method of operating a multi-processor video encoder by determining a target size corresponding to a preferred number of bits to be used when creating an encoded version of a picture in a group of sequential pictures making up a video sequence, the method comprising a) calculating a first degree of fullness of a coded picture buffer at a first time, b) operating on said first degree of fullness to return an estimated second degree of fullness of said coded picture buffer at a second time, and c) operating on said second degree of fullness to return an initial target size for said picture, wherein said first time corresponds to the most recent time an accurate degree of fullness of said coded picture buffer can be calculated and said second time occurs after said first time.

In accordance with a second aspect of the invention there is provided a method of preparing an multi-processor video encoder to encode a picture of a video sequence, the method comprising a) receiving said picture, b) calculating a first degree of fullness of a coded picture buffer at a first time, c) operating on said first degree of fullness to return a second degree of fullness of said coded picture buffer at a second time, d) storing said picture for an amount of time, during said amount of time, e) measuring a first degree of complexity of said picture, f) operating on said first degree of complexity of said picture and said second degree of fullness to return a preferred target size for said picture, and g) subsequently to step d, providing said picture and said preferred target size to said multi-processor video encoder, wherein said first time corresponds to the most recent time an accurate degree of fullness of said coded picture buffer can be calculated and said second time occurs after said first time.

In accordance with a third aspect of the invention there is provided a method of determining a value of a quantization parameter for use in encoding a given macroblock of a sequence of macroblocks, the sequence of macroblocks making up a single picture of a sequence of pictures, the method comprising a) estimating a first degree of fullness of a coded picture buffer at first time, b) determining an accumulated measure of complexity for any macroblocks of the sequence of macroblocks having preceded the given macroblock, c) operating on the first degree of fullness, the accumulated measure of complexity and a target number of bits to return a second degree of fullness of the coded picture buffer at a second time, and d) operating on the second degree of fullness to return a value of the quantization parameter, wherein said target number of bits corresponds to a number of bits to be divided among the sequence of macroblocks when generating an encoded version of said single picture and said second time occurs after said first time.

In accordance with a fourth aspect of the invention there is provided a method of calculating a value of a quantization parameter for use in encoding each macroblock in a sequence of macroblocks, the sequence of macroblocks making up a single picture of a video sequence, the method comprising a) estimating a first degree of fullness of a coded picture buffer at first time, b) determining a target size for an encoded version of said single picture, and c) for each macroblock in said sequence of macroblocks, c1) determining an accumulated measure of complexity for any preceding macroblocks of the sequence, c2) operating on the first degree of fullness, the accumulated measure of complexity and the target size to return a second degree of fullness of the coded picture buffer at a second time, and c3) operating on the second degree of fullness to return the value of the quantization parameter for use in encoding the given macroblock, wherein said target size corresponds to a number of bits to be divided among the sequence of macroblocks when generating an encoded version of said single picture, the size, in bits, of an encoded version of a given macroblock is a function of the value quantization parameter used in encoding the macroblock, and said second time occurs after said first time.

In accordance with a fifth aspect of the invention there is provided a method of operating a multi-processor encoder by estimating a degree of fullness of a coded picture buffer at a future time prior to encoding a plurality of pictures in parallel with the multi-processor encoder, the method comprising predicting a number of bits needed to represent encoded versions of the plurality of pictures using a first video encoding procedure, calculating a degree of fullness of the coded picture at a first time, the first time being prior to the future time, generating a mismatch term by comparing previously predicted numbers of bits needed to represent encoded versions of a plurality of previously encoded pictures to actual numbers of bits needed to represent the plurality of previously encoded pictures, and combining the calculated degree of fullness of the coded picture at the first time, the predicted number of bits needed to represent an encoded version of the first picture, and the mismatch term to return an estimated degree of fullness of the coded picture at the future time, and wherein the future time corresponds to the time at which an encoded version of the first picture is loaded into the coded picture and the first time represents the most recent time at which a degree of fullness of the coded picture can be accurately calculated.

In accordance with a sixth aspect of the invention there is provided a method of operating a multi-processor video encoder to prevent underflow of a coded picture buffer, the method comprising encoding a picture of a video sequence using a first number of bits, storing the encoded version of the picture for an amount of time, calculating a degree of fullness of the coded picture buffer, determining if the coded picture buffer is in danger of underflowing, and if the coded picture buffer is in danger of underflowing, calculating a number of stuff bits required to increase the fullness of the coded picture buffer to level where the coded picture buffer is no longer in danger of underflowing, and adding said number of stuff bits to the encoded version of the picture, thereby increasing the size of the encoded version of the picture to a second number of bits, and transmitting the encoded version of the picture.

In accordance with a seventh aspect of the invention there is provided a method of operating a multi-channel video encoder having a plurality of dual pass, multi-processor single channel encoders, each single channel encoder sharing a common video clock and having a 1st pass encoder and a 2nd pass encoder, and the method comprising for each of the plurality of dual pass, multi-processor single channel encoders, receiving an unencoded, single program video stream including a plurality of sequential pictures and an embedded video clock, creating a copy of the unencoded, single program video stream, storing the unencoded, single program video stream, modifying the embedded video clock of the copy to synchronize it with the common video clock, and performing first pass encoding on the copy, thereby generating complexity statistics for the copy, determining a preferred target size for pictures of each of the unencoded single program video streams by operating on the complexity statistics, for each of the plurality of dual pass, multi-processor single channel encoders: performing 2nd pass encoding on the unencoded single program video stream using the preferred target size as an input to generate an encoded single program video stream, multiplexing the plurality of encoded single program video streams together into a multi-program transport stream, and transmitting the multi-program transport stream.

BRIEF DESCRIPTION OF THE DRAWINGS

FIG. 4 is a block diagram of a multi-channel encoder embodying the present invention
FIG. 5 is a block diagram of a single channel encoder unit embodying the present invention for use in the multi-channel encoder of FIG. 3.

DETAILED DESCRIPTION

The embodiments of the present invention described below are not specific to any one video coding standard. However, it is assumed for the purposes of this description that the video coding standard in question utilizes conventional techniques, such as dividing individual pictures, or frames, into macroblocks and dividing a plurality of sequential pictures into a group of pictures (GOP) for encoding purposes.

Figure 1:
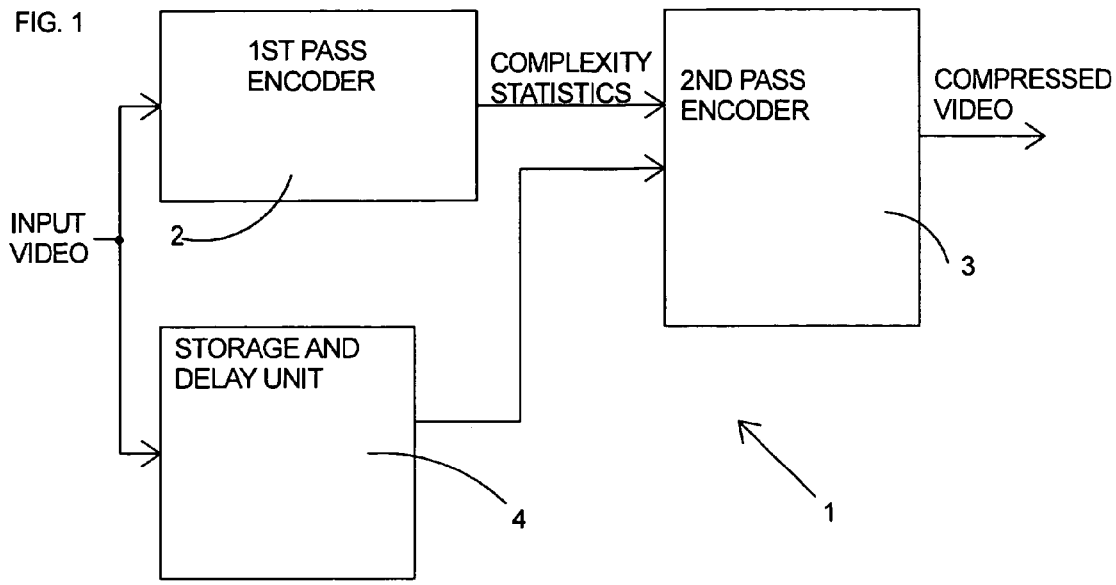
FIG. 1 is a block diagram of a dual pass encoder.
Figure 2:
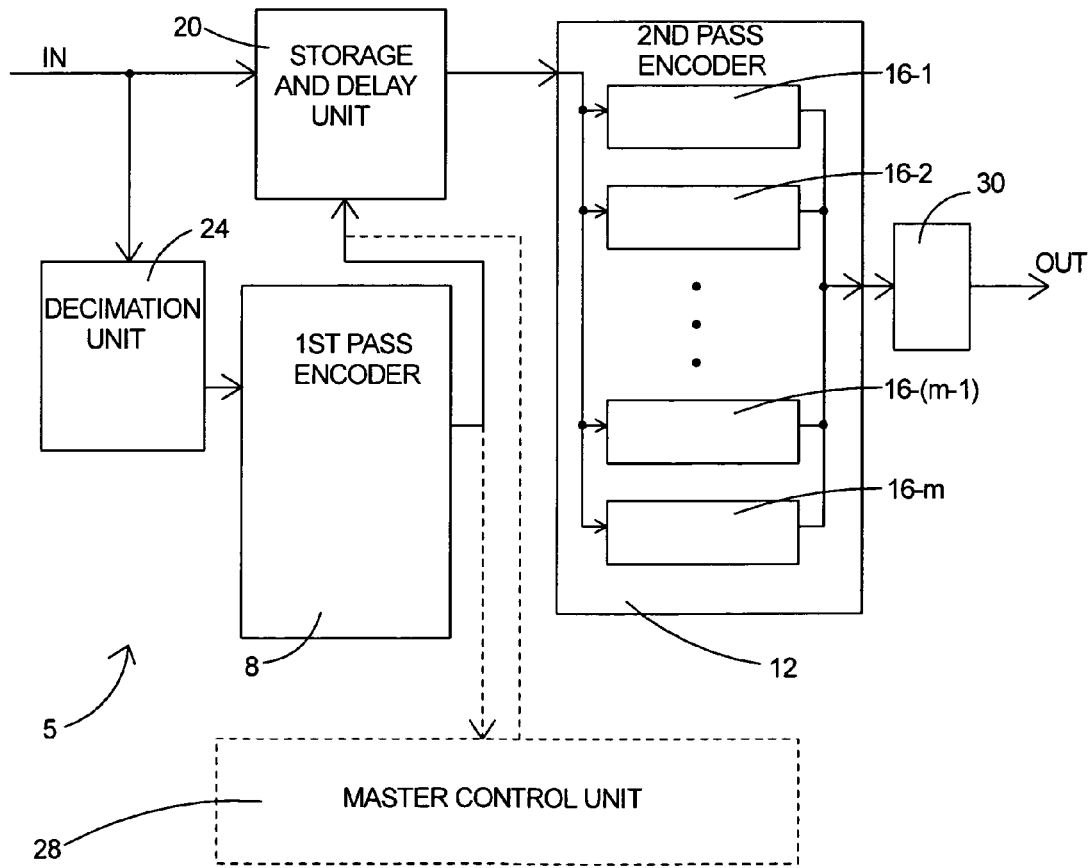
FIG. 2 is a block diagram of a single channel encoder embodying the present invention.

Referring to FIG. 2, a single channel dual pass encoder 5 receives an unencoded video stream IN as input and transmits an encoded SPTS OUT (VBR or CBR) as an output. The dual pass encoder 5 has a multi-processor architecture and includes a low complexity 1st pass encoder 8 and a high complexity 2nd pass encoder 12. The 1st pass encoder 8 is a conventional single processor encoder and the 2nd pass encoder 12 is a pipelined parallel encoder as described above and includes m processing units 16-$x$ ($x=1 \ldots$ m). Each picture j of the video stream IN is received by a storage and delay unit 20 and a decimation unit 24. The storage and delay unit 20 acts as a first-in, first-out (FIFO) type buffer with a depth of d pictures, as well as a look-ahead window for the pictures of the input stream.

The decimation unit 24 reduces the resolution of each picture j in the video stream IN by a fixed amount, creating a corresponding low resolution version $j_d$, in order to enable the computational complexity of the processing unit (not shown) within the 1st pass encoder 8 to be low compared to that of a 2nd pass processing unit 16-$x$. As a simplified example, if the decimation unit 24 reduces the resolution of the video stream IN by a factor of two in both the horizontal and vertical directions, the complexity of the 1st pass encoder 8 will only need to be a quarter of the complexity of a 2nd pass processing unit 16-$x$ and therefore the total computational complexity necessary for the dual pass encoder 5 to encode a single picture is approximately 25% more than a single pass encoder.

The decimated video stream is input to the 1st pass encoder 8 where, in the course of a conventional encoding process implemented by the 1st pass encoder 8, picture and macroblock-level complexity statistics are calculated for each decimated picture $j_d$. The complexity statistics are used to generate a complexity measure $c_j$ for each decimated picture $j_d$ and an accumulated complexity measure from macroblock to macroblock. The complexity statistics and measures are stored in a look-ahead window, described below. The 2nd pass encoder 12 receives the picture j of the video. The picture j is then assigned to a processing unit 16-$x$ for encoding. Because of the 2nd pass encoder's parallel design, at the beginning of each time slot u multiple pictures may be loaded into the 2nd pass encoder, similarly to the example shown in Table 1.

If the dual pass encoder 5 is a stand alone, single channel encoder, as is shown in solid lines in FIG. 2, the 2nd pass encoder 12 may also act as a control unit. Alternatively, a separate master control unit 28 will use the complexity measure $c_j$ as an input to a picture-level rate control algorithm to select a target value $T_j$ for the size of an encoded version of the undecimated picture j. The picture-level rate control algorithm also uses $T_j$ to calculate an estimated value $B_u$ of the dual pass encoder's virtual buffer fullness at the conclusion of a time slot u. The picture-level rate control algorithm can be implemented within the 1st pass encoder 8.

Therefore the 1st pass encoder 8 and the picture-level rate control algorithm must be able to process the decimated pictures at a fast enough rate to provide the multiple target values simultaneously to the 2nd pass encoder 12 at the beginning of each time slot u. The 2nd pass encoder unit 5 uses $T_j$ to generate an encoded version of the picture j, which is then output from the dual pass encoder unit 5 as part of the VBR or CBR SPTS OUT.

The 2nd pass encoder 12 temporarily stores information about each encoded picture in a moving average window. As described below, the rate control algorithms utilize information stored in both the look-ahead window and the moving average window when calculating a picture's target size.

If the output of the single channel encoder 5 is a CBR video stream, it is sometimes necessary to stuff bits into the encoder's virtual buffer so that the encoder's virtual buffer fullness does not become negative. Because the true value of virtual buffer fullness is not available until after the pipeline delay, the compressed output stream is buffered for at least p time slots in a stuff bit inserter 30 so that the correct number of stuff bits can be added.

The following video sequence is shown, from left (past) to right (future), in display order.

The subscripts indicate encode order as shown in Table 2 below:

$\ldots B_{-5} B_{-4} P_{-6} B_{-2} B_{-1} P_{-3} B_1 B_2 I_0 B_4 B_5 P_3 B_7 B_8 P_6 B_{10} B_{11} P_9 B_{13} B_{14} P_{12} B_{16} B_{17} I_{15} \ldots$ The negative subscripts indicate previously encoded pictures.

Table 2 shows activities in the multi-processor encoder shown in FIG. 2 for a series of time slots starting from u=1. Similar to the case of Table 1, Table 2 is also simplified and shows only encoding activities. Activities such as receiving uncompressed pictures, sending reconstructed pictures, receiving reconstructed pictures, necessary delay, etc are omitted as they are not essential for the illustration of the rate control algorithm.

TABLE 2

| Processor | u = 1 | u = 2 | u = 3 | u = 4 | u = 5 | u = 6 | u = 7 | u = 8 |
|---|---|---|---|---|---|---|---|---|
| 1 | $I_0$ | $P_3$ | $P_6$ | $P_9$ | $P_{12}$ | $I_{15}$ | $P_{18}$ | $P_{21}$ |
| 2 | $B_{-2}$ | $B_{-2}$ | $B_4$ | $B_4$ | $B_{10}$ | $B_{10}$ | $B_{16}$ | $B_{16}$ |
| 3 | $B_{-1}$ | $B_{-1}$ | $B_5$ | $B_5$ | $B_{11}$ | $B_{11}$ | $B_{17}$ | $B_{17}$ |
| 4 | $B_{-5}$ | $B_1$ | $B_1$ | $B_7$ | $B_7$ | $B_{13}$ | $B_{13}$ | $B_{19}$ |
| 5 | $B_{-4}$ | $B_2$ | $B_2$ | $B_8$ | $B_8$ | $B_{14}$ | $B_{14}$ | $B_{20}$ |
| encoded | $P_{-9}$ | $P_{-6}$ | $P_{-3}$ | $I_0$ | $P_3$ | $P_6$ | $P_9$ | $P_{12}$ |
| pictures available | $B_{-8}$ | $B_{-5}$ | $B_{-2}$ | $B_1$ | $B_4$ | $B_7$ | $B_{10}$ | $B_{13}$ |
|  | $B_{-7}$ | $B_{-4}$ | $B_{-1}$ | $B_2$ | $B_5$ | $B_8$ | $B_{11}$ | $B_{14}$ |

Figure 3:
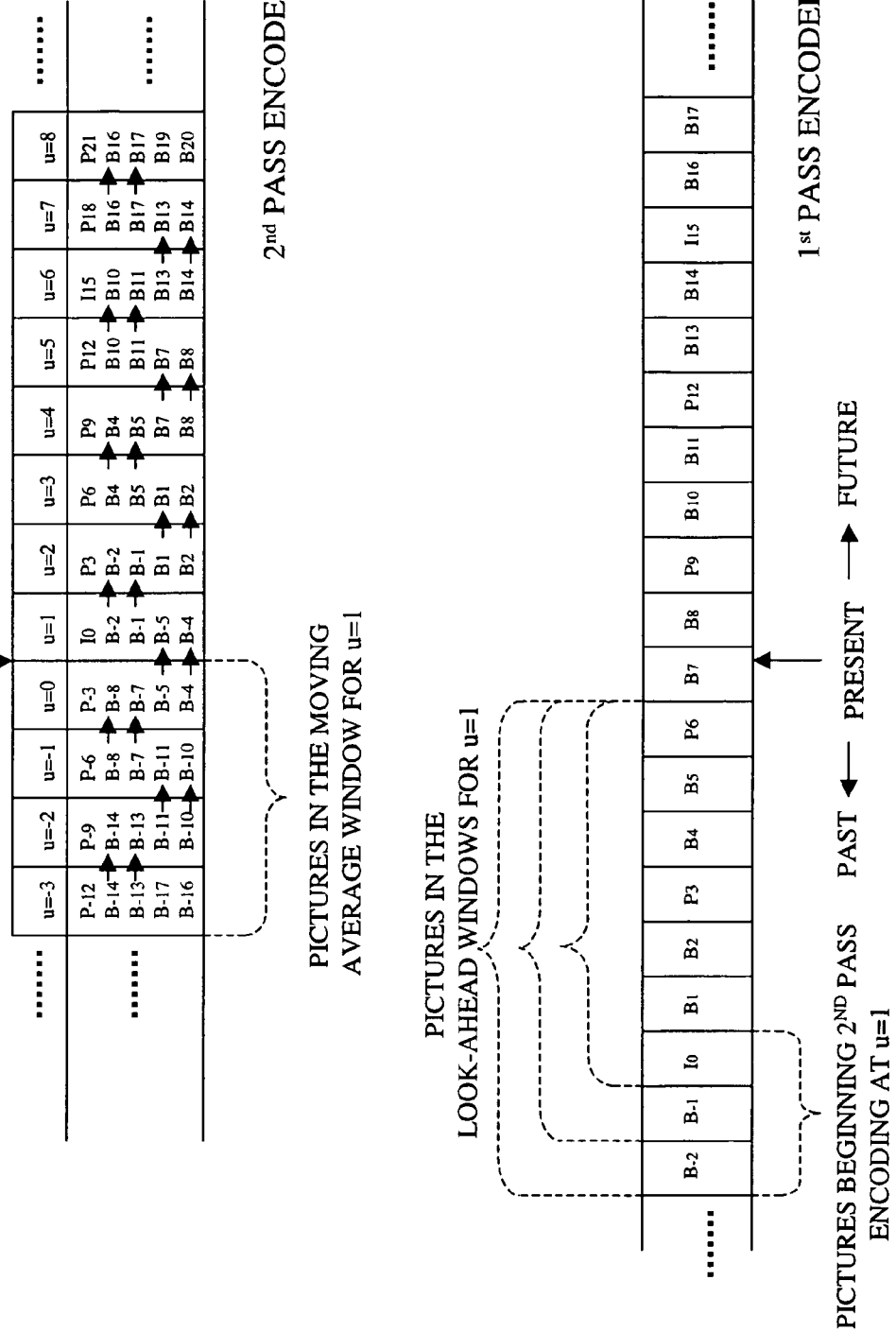
FIG. 3 is a timing diagram showing the relationship between a 1st pass encoder and a 2nd pass encoder within a dual-pass encoder embodying the present invention.

FIG. 3 shows the timing relationship between the 1st pass encoder 8 and the 2nd pass encoder 12 while the dual pass encoder 5 is in the process of encoding the video sequence shown in part in Table 2. At the beginning of the current time slot (u=1), the encoder's rate control algorithm utilizes previously obtained 1st pass data stored in the look-ahead window and previously obtained 2nd pass data stored in the moving average window to calculate a target size for pictures $I_0$, $B_{-2}$, and $B_{-1}$. The 1st pass data stored in the look-ahead window pertains to the pictures currently being encoded by the 2nd pass encoder and the subsequent pictures that have previously been encoded by the 1st pass encoder 8 but have not yet reached the 2nd pass encoder 12. The 2nd pass data stored in the moving average window pertains to pictures that have recently been encoded by the 2nd pass encoder 12. The greater the size of the look-ahead and moving average windows, in terms of the number of pictures stored therein, the more accurately the rate control algorithm will be able to calculate target sizes for the pictures being encoded by the 2nd pass encoder.

The following list of notations and variables is provided for clarity in describing the picture-level rate control algorithm for a single channel encoder:

i is used as an index for a single channel encoder unit and as an index for the single channel encoder unit's corresponding video stream in a multi-channel encoder. In the embodiment discussed above and shown in FIG. 2, i is not specified.

j is used as index for picture number. Pictures are numbered starting at 1 and increase by 1 for each next picture.

u is used as an index for time slots, specifically in relation to the 2nd pass encoder. Time slots are numbered starting at 1 and increase by 1 for each subsequent time slot.

$U_u$ is used to represent the set of pictures being encoded by the 2nd pass encoder during time slot u. In the example shown in Table 2, $U_5 = \{P_{12}, B_{10}, B_{11}, B_7, B_8\}$.

k is used as an index for the pictures in set $U_u$. Note that a given picture k in the set $U_u$ will have a corresponding index j relative to the video stream. The index that is used will depend on the context.

$|B_i|$ is the size, in bits, of the single channel encoder's virtual buffer. For example, in an MPEG-2 encoder the virtual buffer is the VBV buffer and in an H.264 encoder the virtual buffer is the coded picture buffer (CPB). Note that $|B_i|$ is not the maximum size allowed by a particular standard but is the actual maximum based on the desired bit rate for video stream i.

$B_{i,u}$ is the estimated fullness of the single channel encoder's virtual buffer for video stream i just prior to the encoding of all pictures in the 2nd pass encoder in time slot u.

$b_{i,j}$ is the size, in bits, of an encoded version of the jth picture from the video stream i, as encoded by the 1st pass encoder.

$q_{i,j}$ is a quantizer used by the 1st pass encoder for picture j of video stream i.

$c_{i,j}=q_{i,j}b_{i,j}$ is a value representative of the complexity of picture j of the video stream i as measured by the 1st pass encoder. After $c_{i,j}$ has been measured by the 1st pass encoder it is stored in the look-ahead window.

$c_{i,j}^I=c_{i,j}$ if picture j of video stream i is an I type picture, otherwise $c_{i,j}^I$ undefined.

$c_{i,j}^P=c_{i,j}$ if picture j of video stream i is an P type picture, otherwise $c_{i,j}^P$ is undefined.

$c_{i,j}^B=c_{i,j}$ if picture j of video stream i is an B type picture, otherwise $c_{i,j}^B$ is undefined.

$\hat{B}_{i,u}$ is the actual fullness of the single channel encoder's virtual buffer for video stream i just prior to the encoding of all pictures in the 2nd pass encoder in time slot u.

$\hat{b}_{i,j}$ is the size, in bits, of an encoded version of the jth picture from video stream i, as encoded by the 2nd pass encoder.

$\hat{q}_{i,j}$ is the average quantizer used by the 2nd pass encoder for picture j of video stream i. The average quantizer is the sum of the individual macroblock quantizers divided by the number of macroblocks.

$\hat{c}_{i,j}=\hat{q}_{i,j}\hat{b}_{i,j}$ is a value representative of the complexity of picture j of video stream i as measured by the 2nd pass encoder.

$\hat{c}_{i,j}^I=\hat{c}_{i,j}$ if picture j of video stream i is an I type picture, otherwise $\hat{c}_{i,j}^I$ is undefined. Similar definitions apply to $\hat{c}_{i,j}^P$ and $\hat{c}_{i,j}^B$.

d is the depth of the lookahead window in the storage and delay unit.

p is the depth of the 2nd pass encoder's pipeline.

$e_u$ is the number of pictures encoded from time slot u-p up to time slot u-1.

$m_{i,u}$ is a small "mismatch" term that reflects any error between the estimated buffer fullness $B_{i,u}$ and the actual buffer fullness $\hat{B}_{i,u}$ for the time slot u.

$R_i$ is the target total number bits per picture time for the output video stream i. If the output video stream i is CBR then $R_i$ is a constant.

$\sigma_i$ is a "sensitivity" factor for the speed at which the fullness of the single channel encoder's virtual buffer is adjusted. It is described below.

$T_{i,j}^0$ is an initial target size for an encoded version of picture j of video stream i.

$T_{i,j}$ is an adjusted target size for picture j of video stream i.

$V_u$ is the set for all bit rate targets of pictures encoded from time slot u-p up to time slot u-1.

$w_{i,j}$ is a weight used to convert the 1st pass complexity value $c_{i,j}$ for picture j of video stream i to an approximation of what the 2nd pass complexity value $\hat{c}_{i,j}$ would be. This conversion is not linear, and therefore $w_{i,j}$ is updated in each time slot because it is context dependent. More detailed description is given below in Equations 2, 3, and 4.

$w_{i,j}^I=w_{i,j}$ if picture j of video stream i is an I type picture, otherwise $w_{i,j}^I$ is undefined. Similar definitions apply to $w_{i,j}^P$ and $w_{i,j}^B$.

$\Omega^I$, $\Omega^P$, and $\Omega^B$ are weighting factors used in the calculation of $w_{i,j}$.

$S_{i,k}$ is the summation of the weighted 1st pass complexity for all of the pictures in the lookahead window. Note that the summation $S_{i,k}$ is performed over the lookahead window of the 1st pass encoder, which is different from the moving average window (which relates to pictures previously encoded by the 2nd pass encoder).

N is the number of pictures in the moving average window. $N^I \ldots N^P$ and $N^B$ have similar definitions.

The picture-level rate control algorithm calculates an initial target number of bits for each picture k that enters the 2nd pass encoder at the beginning of time slot u using data stored in the look-ahead window from the 1st pass encoding of the pictures k through k+(d-1) and 2nd pass data from other pictures previously encoded by the 2nd pass encoder stored in the moving average window. The initial target number is calculated according to the equation:

$$T_{i,k}^0 = \frac{w_{i,k}c_{i,k}}{S_{i,k}} \cdot \left( d \cdot R_i + \sigma_{i,k}\left(\frac{1}{2}|B_i| - B_{i,u} + m_{i,u-1}\right)\right) \quad \text{(Equation 1)}$$

for $k \in (U_u)$

The weight $w_{i,k}$ is a function of previous 1st pass complexity measures and previous 2nd pass complexity measures for pictures in the moving average window of the video stream i. Note that in a pipelined implementation such as the one shown in FIG. 2, the 2nd pass complexity for pictures that have not finished encoding will not be available.

There are three different weighting functions $W_i^{type}$, one for each picture-type (I, P, or B). They all have the general form:

$$w_{i,k}^I = W_i^I(\{c_{i,j}^I|j \leq k\}, \{\hat{c}_{i,j}^I|j \leq k-d-p\}) \quad \text{(Equation 2a)}$$

$$w_{i,k}^P = W_i^P(\{c_{i,j}^P|j \leq k\}, \{\hat{c}_{i,j}^P|j \leq k-d-p\}) \quad \text{(Equation 2b)}$$

$$w_{i,k}^B = W_i^B(\{c_{i,j}^B|j \leq k\}, \{\hat{c}_{i,j}^B|j \leq k-d-p\}) \quad \text{(Equation 2c)}$$

A simple form for the weighting function $W_i^I$ is a moving average of the ratio of previous 2nd pass complexity measures of the appropriate picture type divided by previous 1st pass complexity measure of the same picture type. For example, for an I-type picture:

$$W_i^I = \frac{\sum_{j \in I\_set} \frac{\hat{c}_{i,j}^I}{c_{i,j}^I}}{N^I} \quad \text{(Equation 3)}$$

where I_set is of size $N^I$ and whose elements are the greatest integers which satisfy the above general form for $w_{i,j}^I$ in equation 2a. Note that while $N^I$ is the number of I-type pictures in the moving average window, at start up the 2nd pass complexity measures are unavailable for the first p+d pictures and therefore $w_{ik}$ will be the constant ratio between the complexity of the 2nd pass pictures and the decimated 1st pass pictures. Typically the most recent picture should be weighted more heavily than the rest so a more sophisticated embodiment of the weighting function $W_i^I$ for the I-type picture weights is:

$$W_{ik}^I = \frac{\Omega^I \left(\frac{\hat{c}_{i,k_0}^I}{c_{i,k_0}^I}\right) + \sum_{j \in I\_set'} \frac{\hat{c}_{i,k}^I}{c_{i,k}^I}}{N^I + \Omega^I - 1}, k_0 = k - d - p \quad \text{(Equation 4)}$$

where I_set'=I_set−{$k_0$}. There are similar equations for the P and B pictures with appropriate definitions for P_set and B_set.

Therefore, referring to equation 1, the product of the weight $w_{i,j}$ and the 1st pass complexity $c_{i,j}$ for a picture j gives an approximation of the picture j's 2nd pass complexity $\hat{c}_{i,j}$, before the picture j has been received by the 2nd pass encoder. This approximation is divided by a scaling factor $S_{i,k}$:

$$S_{i,k} = \sum_{j=k}^{k+d-1} (w_{i,j \bmod d} c_{i,j}) \quad \text{(Equation 5)}$$

where d represents the size of the look-ahead window. The complexity ratio $$\frac{w_{i,k} c_{i,k}}{S_{i,k}}$$

represents a measurement of the picture k's approximated 2nd pass complexity compared to the approximated 2nd pass complexity of the other pictures in the set $U_u$.

In order for the picture-level rate control algorithm to select an appropriate value of $T_{i,k}$ for an encoded version of the picture k of video stream i, the algorithm needs to account for the current fullness of the encoder's virtual buffer. Ideally the picture-level rate control algorithm would utilize the actual buffer fullness $\hat{B}_{i,u}$ for time slot u. However, the encoder's pipeline delay of p time slots results in the actual buffer fullness $\hat{c}_{i,u}$ not being known until time slot u+p. Therefore, an estimated virtual buffer fullness $B_{i,u}$, based on information from previous time slots, is used in the place of the actual virtual buffer fullness in equation 1:

$$B_{i,u} = B_{i,u-p} + \sum_{k \in V_u} T_{i,k} - e_u R_i \quad \text{(Equation 6)}$$

By definition, $V_u$ and $e_u$ relate to targets and pictures from time slot (u−p) up to time slot (u−1). Equation 6 largely corresponds to the virtual buffer fullness calculation as defined in the various compression standards, but uses a previous estimation of the virtual buffer's fullness rather than a previous calculation.

To compensate for any errors in the estimation of the virtual buffer fullness for the previous time slots, a mismatch term $m_{i,u}$ is used in equation 1. The mismatch term $m_{i,u}$ corresponds to the difference between the most up to date value available for the virtual buffer's actual fullness $\hat{B}_{i,u-p}$ and estimated fullness $B_{i,u-p}$:

$$m_{i,u} = \frac{(\hat{B}_{i,u-p} - B_{i,u-p})}{p} \quad \text{(Equation 7)}$$

Regardless of the relative complexity of a given picture or the buffer fullness during a given time slot, a non-negative number of bits must be assigned to each picture. As the relative complexity of a given picture k will never be negative, it follows from examination of equation 1 that the following relationship must be true for the picture k:

$$d \cdot R_i \geq -\sigma_{i,k}\left(\frac{1}{2}|B_i| - B_{i,u} + m_{i,u-1}\right) \quad \text{(Equation 8)}$$

In operation, the mismatch term $m_{i,u-1}$ will be relatively small and will not have a significant effect on equation 8. Therefore, for the purposes of analyzing equation 8, $m_{i,u-1}$ can be ignored. Thus, the rule defined by equation 8 is in the greatest danger of being violated when the virtual buffer is full, $B_{i,u}=|B_i|$, resulting in:

$$d \cdot R_i \geq \frac{1}{2}\sigma_{i,k}|B_i| \quad \text{(Equation 9)}$$

Rather than simply requiring the initial target bit allocation be non-negative, a more sophisticated embodiment of the invention will assess a minimum bit allocation value $\epsilon_{i,k}$, that is proportional to the minimum number of bits required by whatever video coding standard is implemented by the 2nd pass encoder for picture k's picture type.

Accordingly, equation 9 can be rewritten as:

$$d \cdot R_i - \frac{1}{2}\sigma_{i,k}|B_i| > \varepsilon_{i,k} \quad \text{(Equation 10)}$$

The only component of equation 10 that can be adjusted by the picture-level rate control algorithm from picture to picture independently of picture characteristics is $\sigma_{i,k}$ and an appropriate, picture type dependent value for $\sigma_{i,k}$ can be found by solving equation 10 for $\sigma_{i,k}$:

$$\sigma_{i,k} = \frac{2(d \cdot R_i - \varepsilon_{i,k})}{|B_i|} \quad \text{(Equation 11)}$$

However, due to the mismatch term $m_{i,u}$ the initial target bit allocation, $T_{i,k}^0$, given by equation 1 can generate results that are less than the minimum number of bits required by the video standard being used for picture k's picture type. Therefore the initial target bit allocation is compared to the minimum number of bits and the larger number is used as the final bit allocation $T_{i,k}$ for picture k. As an example, for H.264:

$$T_{i,k}=\max(T_{i,k}^0,\alpha_{i,k}R_i) \quad \text{(Equation 12)}$$

where $\alpha_{i,k}$ is a bit rate and standard dependent weight, represented by look-up tables for I, P, and B types of pictures:

$$\alpha_{i,k}=\alpha_{i,k}^I[\min(\text{bitrate}),\ldots,\max(\text{bitrate})] \quad \text{(Equation 13a)}$$

$$\alpha_{i,k}=\alpha_{i,k}^P[\min(\text{bitrate}),\ldots,\max(\text{bitrate})] \quad \text{(Equation 13b)}$$

$$\alpha_{i,k}=\alpha_{i,k}^B[\min(\text{bitrate}),\ldots,\max(\text{bitrate})] \quad \text{(Equation 13c)}$$

Referring to FIG. 2, by utilizing the picture-level control algorithm described above, the control unit of the single channel encoder 5 is able to predict the fullness of the 2nd pass encoder's virtual buffer with a sufficient degree of accuracy to enable the picture-level rate control algorithm to allocate a number of bits to each picture despite the pipeline delay inherent in the parallel architecture of the 2nd pass encoder.

The encoder shown in solid lines in FIG. 2 is a single channel encoder and accordingly the index i is not specified. In another embodiment of the invention, shown in FIG. 4 and by dotted lines in FIG. 2, n single channel encoders 5-$i$ (i= 1 . . . n) are placed in a multi-channel encoder 32. The multi-channel encoder 32 receives n unencoded video streams IN-i (i=1 . . . n) as input and transmits n SPTSs OUT-i (i=1 . . . n), each at a desired variable bit rate. If desired, different video coding standards can be used for each channel. The encoder 32 includes a master control unit 28 and for each picture j of each video stream i, the 1st pass complexity value is sent from the dual pass encoder 5-$i$ to the master control unit 28. Upon receiving $c_{i,j}$, the master control unit 28 calculates the target value $T_{i,j}$ and transmits this target value back to the dual pass encoder 5-$i$. After receiving $T_{i,j}$, the dual pass encoder 5-$i$ encodes picture j and transmits the encoded version as part of OUT-i. The SPTS OUT-i is then transmitted from the multi-channel encoder 32. The picture-level rate control algorithm for the embodiment shown in FIG. 3 is identical to the picture-level rate control algorithm discussed above, except that i=1 . . . n.

In another embodiment of the invention, indicated by dotted lines in FIG. 4 the n SPTS outputs OUT-i are variable bit rate streams that are statistically multiplexed together by a multiplexer unit 36 to form a single multi-program transport stream (MPTS) M_OUT having an aggregate constant bit rate (CBR). The output M_OUT is transmitted to a downstream multi-channel decoder (not shown) where M_OUT will be buffered, demultiplexed and decoded. Because the n input video streams will all eventually be stored together in a large multi-channel decoder buffer, the multi-channel encoder will use a shared virtual buffer model for all n single channel encoders and the picture-level rate control algorithm must perform a joint target bit allocation operation for the n video streams collectively. As in the embodiment discussed above, the outputs OUT-i can be encoded using different video coding standards. Referring to FIG. 5 in the event that a single channel encoder's output stream OUT-i is going to be multiplexed into a CBR MPTS, the input to the 1st pass encoder 8 is time-base corrected to a common video clock by a corresponding time-based corrector (TBC) unit 40 located between the decimation unit 24 and the 1st pass encoder 8. The rate control algorithm cannot accurately do a joint target bit rate allocation for all n video streams unless the n video streams are synchronized to a common clock. However, it is not necessary to similarly synchronize the video stream at the input to the 2nd pass encoder 12. As the uncorrected clock being input to the 2nd pass encoder 12 drifts away from the corrected clock being input to the 1st pass encoder 8, occasionally there will be a discrepancy between the two sequences of pictures. Such a discrepancy could be either a picture missing from the 1st pass encoder's input relative to the 2nd pass encoder's input, or vice versa. The 2nd pass encoder 28 easily handles such discrepancies. In the former case, the parameters used to encode the previous picture of the same picture type will be used to encode the current picture. In the latter case, the 2nd pass encoder 28 will simply ignore the current picture.

As in the case of using stuff bits to pad the CBR output of a single channel encoder, it is sometimes necessary to pad the MPTS output of the multi-channel encoder so that the encoder's shared virtual buffer fullness does not become negative. Instead of stuff bits, null transport stream packets are inserted in a manner similar to the method described above for single channel encoding, the difference being that the insertion occurs after the n SPTSs have been multiplexed together. After being output from the multiplexer 36, M_OUT is received by a multi-channel null packet inserter 46. The compressed output stream is buffered for at least $\max(p_1, p_2 \ldots p_n)$ time slots so that the correct number of null transport stream packets can be calculated and added, where $p_i$ (i=1, 2, . . . n) is the depth of the $2^{nd}$ pass encoder's pipeline for stream i.

In the embodiment shown by FIG. 4, the single channel encoder units 5-$i$ may contain an adaptive pre-filter 42, shown by dotted lines in FIG. 5. The picture-level complexity statistics obtained from the 1st pass encoder 24 are used to control the strength of the filter 42 for the current GOP before 2nd pass encoding. The adaptive pre-filter 42 is a low-pass filter and its output can be selected to reduce the size of an encoded version of a given picture. The 2nd pass encoder is given either the original uncompressed video source or the output of adaptive pre-filter 42 as an input. The picture-level rate control algorithm makes this decision based on the complexity statistics. See, for example, co-pending U.S. patent application Ser. No. 10/316,483.

The picture-level rate control algorithm in the case of multi-channel encoding with statistical multiplexing, in which the VBR output of multiple single channel individual encoders is combined to form a multiplexed CBR stream, is slightly more complicated than the picture-level rate control algorithm discussed above. A central master rate control may be used for picture-level rate control with statistical multiplexing.

The channels may be encoded using different video standard(s) (MPEG-2, H.264, SMPTE VC-1, etc.). The architecture of each of the single channel encoders is identical, and the picture-level target bit allocation equation is somewhat different from equation 1.

The following list of notations and variables is provided for clarity in describing the picture-level rate control algorithm for a multiple channel encoder with statistical multiplexing:

n is the number of channels the multi-channel encoder is capable of receiving.

R is the constant bit rate per picture for the multiplexed output stream M_OUT.

|B| is the size of the shared virtual buffer used by the n single channel encoders.

$B_u$ is the estimated fullness of the shared virtual buffer for time slot u.

$\hat{B}_u$ is the actual fullness of the shared virtual buffer for time slot u.

$m_u$ is a mismatch term similar to $m_{i,u}$ described above.

The picture-level rate control algorithm calculates an initial target number of bits for each picture k of video stream i during each time slot u according to the equation:

$$T_{i,k}^o = \frac{w_{i,k} c_{i,k}}{S_k} \cdot \left( d \cdot R + \sigma_{i,k} \left( \frac{1}{2} |B| - B_u + m_{u-1} \right) \right) \quad \text{(Equation 14)}$$

for $k \in (U_u)$ $S_k$ is defined differently than in equation 5 because the total complexity now depends on the complexity of all n video channels:

$$S_k = \sum_{i=1}^{n} \sum_{j=k}^{k+d-1} (w_{i,j \bmod d} c_{i,j}) \quad \text{(Equation 15)}$$

Similarly $m_u$ has a different definition than $m_{i,u}$:

$$m_u = \frac{(\hat{B}_{u-p} - B_{u-p})}{p} \quad \text{(Equation 16)}$$

As mentioned above, the n channels could be encoded using different video coding standards. In that case, $c_{i,j}$ is standard dependent and $w_{i,j}$ not only converts from 1st pass complexity to 2nd pass complexity, but also normalizes complexity between different video coding standards to a common base standard. The bit rate allocation for a particular picture k is determined by the combination of depth of the look-ahead window d, the number of channels n, and the total complexity of all the pictures in each channel's look-ahead window. Because the multiplexed output M_OUT is CBR, each SPTS OUT-i is encoded as a VBR SPTS. The picture-level rate control algorithm ensures that the bit rates of the n SPTSs combine to form the desired CBR.

In all of the above embodiments of the invention, the dual pass nature of the single channel encoders are used to implement a MB-level rate control algorithm in a single channel encoder's 2nd pass encoder. The target bit allocation $T_{i,k}$ provided by the picture-level rate control algorithm must be divided among the MBs of the picture k. Because the complexity of individual MBs typically varies from MB to MB, a uniform allocation, for instance dividing $T_{i,k}$ by the number of MBs in picture k, is not usually an optimal solution.

The 1st pass encoder measures macroblock complexity during the encoding process. Because the resolution and bit rate of the 1st pass encoder are different from those of the 2nd pass encoder and because mode decisions in the 2nd pass encoder are independent of mode decisions made in the 1st pass encoder, the true value of a MB's complexity as would be measured by the 2nd pass encoder cannot be accurately calculated based on the 1st pass encoder's measurements of that MB's complexity. However, the important measure is not the true value of MB level complexity; but the relative complexity of macroblocks; i.e., how the complexity fluctuates from MB to MB. If the $1^{st}$ pass encoder measures a first area of a picture as being simple/complicated relative to a second area of the picture, the $2^{nd}$ pass encoder will likely also measure the first area of the picture as being simple/complicated relative to the second area of the picture. This mapping relationship will be explained in detail in reference to FIG. 5 and FIG. 6 below. The MB-level rate control algorithm uses this relationship advantageously.

The macroblock-level rate control algorithm in all the aforementioned embodiments of the present invention is the same. The purpose of MB-level rate control is a) to ensure that the actual size of an encoded version of the picture j as generated by the 2nd pass encoder is close to the target size $T_{i,j}$ assigned by the picture-level rate control algorithm; b) to ensure the available bits are distributed among MBs based on relative MB complexity. As stated above, the actual value of a MB's complexity is not particularly important when determining MB level bit allocation. Of far greater significance is the relative complexity of a particular MB; i.e., how the complexity fluctuates from MB to MB. The MB to MB 2nd pass complexity fluctuations for a picture can be predicted by mapping the 2nd pass MBs to the corresponding 1st pass MBs comparing the relevant 1st pass complexity fluctuations.

Figure 6:
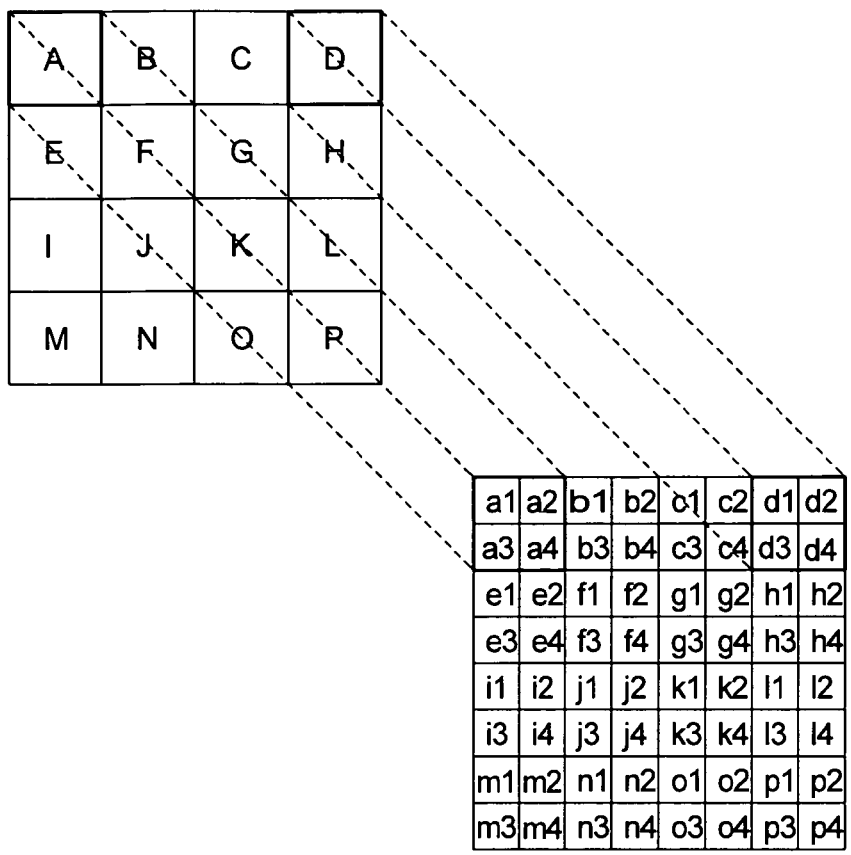
FIG. 6 is a simplified representation of two versions of a single picture to illustrate division of the picture into macroblocks in two different ways.

For simplicity of illustration, assume pictures being received by the dual pass encoder are made up of 64 MBs in an 8×8 array. The input to the 1st pass encoder is decimated such that the resolution of a picture entering the 1st pass encoder is reduced by one half both horizontally and vertically. Therefore, the pictures entering the 1st pass encoder will be made up of 16 MBs in a 4×4 array as shown in FIG. 6. In reality, a picture could contain hundreds or even thousands of MBs depending on its resolution, but conclusions and equations derived from this simplified example apply to any resolution. The simplification is not indispensable; it is just for convenience of illustration. FIG. 6 shows two versions of a picture j. In one version, the picture j has been resolved by a first pass encoder into a 4×4 array of macroblocks. In the second version, the picture j has been resolved by a 2nd pass encoder into an 8×8 array of macroblocks. In the first version each MB is designated by a single capital letter (A-P) and in the second version each MB is designated by a lower case letter prefix (a-p) and a numerical suffix (1-4). The following list of notations and variables is provided for clarity in describing the MB-level rate control algorithm in reference to FIG. 6:

N1 is the number of macroblocks in an encoded version of a given picture generated by a 1st pass encoder. In the example shown in FIG. 6, N1 equals 16.

k is used as an index for macroblock ordinals in the encoded version of the picture generated by the 1st pass encoder. Macroblock ordinals begin at zero so k=0 . . . (N1−1) and in the example shown in FIG. 6, k=0 . . . 15.

v is the number of rows of macroblocks in the encoded version of the picture generated by the 1st pass encoder. Assuming uniform macroblock size, which is not required in some coding standards, such H.264, v corresponds to the number of rows of macroblocks. In the example shown in FIG. 6, v=4.

i is the row index for macroblock ordinals in the encoded version of the picture generated by the 1st pass encoder. Horizontal ordinals begin at zero so i=0 . . . (v−1)

h is the number of columns of macroblocks in the encoded version of the picture generated by the 1st pass encoder. Assuming uniform macroblock size, which is not required in some coding standards, such H.264, h corresponds to the number of columns of macroblocks. In the example shown in FIG. 6, h=4 j is the column index for macroblock ordinals in the encoded version of the picture generated by the 1st pass encoder. Vertical ordinals begin at zero so j=0 . . . (h−1)

N2 is the number of macroblocks in an encoded version of the picture generated by a 2nd pass encoder. In the example shown in FIG. 6, N2=64

$\hat{k}$ is used as an index for macroblock ordinals in the encoded version of the picture generated by the 2nd pass encoder. Macroblock ordinals begin at zero so $\hat{k}$=0 . . . (N2−1) and, in the example shown in FIG. 6, $\hat{k}$=0 . . . 63.

$\hat{i}$ is the row index for macroblocks in the encoded version of the picture generated by the 2nd pass encoder.

$\hat{j}$ is the column index for macroblocks in the encoded version of the picture generated by the 2nd pass encoder.

$m_h$ and $m_v$ are integer multipliers, in the horizontal and vertical directions respectively, that represent the difference in resolution between the 1st pass encoder and the 2nd pass encoder: $m_h m_v$=N2/N1. In the example shown in FIG. 6, the resolution of the 2nd pass encoder is double the resolution of the first pass encoder in both the horizontal and vertical directions so $m_h$=2 and $m_v$=2.

$g_k$ is the complexity of macroblock k as measured by the 1st pass encoder. It is also known as the 1st pass complexity of macroblock k.

$\gamma_k$ is the accumulated 1st pass complexity value of macroblocks 0 through k.

$u_k$ is the number of bits generated by the 1st pass encoder after encoding up to but not including macroblock number k for a given picture.

$\hat{g}_k$ is the mapped 2nd pass complexity of the macroblock k for a given picture. $\hat{\gamma}_k = \hat{g}_k + \hat{\gamma}_{k-1}$.

$\hat{\gamma}_k$ is the accumulated mapped 2nd pass complexity values for macroblocks 0 through k and is further defined below.

$\hat{u}_k$ is the number of bits generated by the 2nd pass encoder after encoding up to but not including macroblock number k for a given picture.

$\alpha_I$ is an amplification factor that adjusts MB-level control sensitivity for I-type pictures.

$\alpha_P$ is an amplification factor that adjusts MB-level control sensitivity for P-type pictures.

$\alpha_B$ is an amplification factor that adjusts MB-level control sensitivity for B-type pictures.

$Q_k$ is the quantizer used for a macroblock k by the 2nd pass encoder.

$q^{max}$ is the maximum value of the quantizer. It is standard dependent. For H.264, $q^{max}$ is 51.

$V_k$ is the 2nd pass encoder's accumulated virtual buffer fullness after encoding up to but not including macroblock k.

$V_j$ is the 2nd pass encoder's virtual buffer initial fullness.

When the 2nd pass encoder is encoding a macroblock $\hat{k}$, the macroblock-level rate control algorithm needs the complexity information from the corresponding 1st pass macroblock k. However, as shown in FIG. 6, the decimated video stream received by the 1st pass encoder will be encoded differently than the original video stream received by the 2nd pass encoder and the macroblocks of the respective encoded versions of a given picture will not be identical. Therefore, in order for the 2nd pass encoder to use the complexity information generated by the 1st pass encoder, the macroblock-level rate control algorithm must map the 2nd pass macroblock $\hat{k}$ to the 1st pass macroblocks in order to determine the ordinal of the corresponding 1st pass macroblock k. This is accomplished using the known differences in vertical and horizontal resolution between the 1st pass encoder and the 2nd pass encoder:

$$\hat{i} = \left\lfloor \frac{\hat{k}}{m_h h} \right\rfloor \quad \text{(Equation 17)}$$

$$\hat{j} = \mod(\hat{k}, m_h h) \quad \text{(Equation 18)}$$

Equations 17 and 18 return the 2nd pass row and column ordinals respectively. The corresponding 1st pass row and column ordinals can then be calculated:

$$i = \left\lfloor \frac{\hat{i}}{m_v} \right\rfloor \quad \text{(Equation 19)}$$

$$j = \left\lfloor \frac{\hat{j}}{m_h} \right\rfloor \quad \text{(Equation 20)}$$

and the ordinal k of the 1st pass macroblock corresponding to the 2nd pass macroblock $\hat{k}$ can then be calculated:

$$k = h \cdot i + j \quad \text{(Equation 21)}$$

Referring again to FIG. 6, for MB n2:

$$\hat{k}_{n2} = 51$$

$$\hat{i} = \left\lfloor \frac{51}{2 \cdot 4} \right\rfloor = \left\lfloor \frac{51}{8} \right\rfloor = 6$$

$$\hat{j} = \mod(51, 2 \cdot 4) = 3$$

$$i = \left\lfloor \frac{6}{2} \right\rfloor = 3$$

$$j = \left\lfloor \frac{3}{2} \right\rfloor = 1$$

$$k = 4 \cdot 3 + 1 = 13 = k_N$$

Equations 17 through 21 can be combined into a single function map( ) for directly mapping $\hat{k}$ to the appropriate value of k:

$$k = map(\hat{k}) = h \left\lfloor \frac{\lfloor \hat{k}/(m_h h) \rfloor}{m_v} \right\rfloor + \left\lfloor \frac{\mod(\hat{k}, m_h h)}{m_h} \right\rfloor \quad \text{(Equation 22)}$$

The 2nd pass MB complexity fluctuations can thereby be predicted using the accumulated complexity for the corresponding 1st pass MBs:

$$\hat{\gamma}_{\hat{k}} = \sum_{x=0}^{\hat{k}} \hat{g}_x = \sum_{x=0}^{\hat{k}} g_{map(x)} \quad \text{(Equation 23)}$$

Where x is simply an index. As an example, assume 1st pass MBs A, B, C and D (k=0, 1, 2 and 3) have 1st pass complexity values $g_k$ of 184, 667, 190 and 122 respectively (note, these numbers are normalized complexity values taken from a sample image and are given as an example only). The accumulated 1st pass complexity for these MBs would therefore be:

$$\gamma_0 = g_0 = 184$$

$$\gamma_1 = g_0 + g_1 = 851$$

$$\gamma_2 = g_0 + g_1 + g_2 = 1041$$

$$\gamma_3 = g_0 + g_1 + g_2 + g_3 = 1163$$

For 2nd pass MBs a1 ($\hat{k}_{a1}=0$) and a2 ($\hat{k}_{a2}=1$), equation 23 yields:

$$\hat{\gamma}_0 = \sum_{x=0}^{0} g_{map(x)} = g_{map(0)} = g_0 = 184$$

$$\hat{\gamma}_1 = \sum_{x=0}^{1} g_{map(x)} = g_{map(0)} + g_{map(1)} = g_0 + g_0 = 184 + 184 = 366$$

The mapped accumulated complexity for the remaining 2nd pass MBs can be similarly calculated. The mapped accumulated complexity for the 2nd pass MBs in rows $\hat{j}=0$ and $\hat{j}=1$ is shown in Table 3:

TABLE 3

| | $\hat{j}=0$ | | | $\hat{j}=1$ | |
|---|---|---|---|---|---|
| MB | $\hat{k}$ | $\hat{\gamma}_k$ | MB | $\hat{k}$ | $\hat{\gamma}_k$ |
| a1 | 0 | 184 | a3 | 8 | 2510 |
| a2 | 1 | 368 | a4 | 9 | 2694 |
| b1 | 2 | 1035 | b3 | 10 | 3361 |
| b2 | 3 | 1702 | b4 | 11 | 4028 |
| c1 | 4 | 1892 | c3 | 12 | 4218 |
| c2 | 5 | 2082 | c4 | 13 | 4408 |
| d1 | 6 | 2204 | d3 | 14 | 4530 |
| d2 | 7 | 2326 | d4 | 15 | 4652 |

Figure 7A:
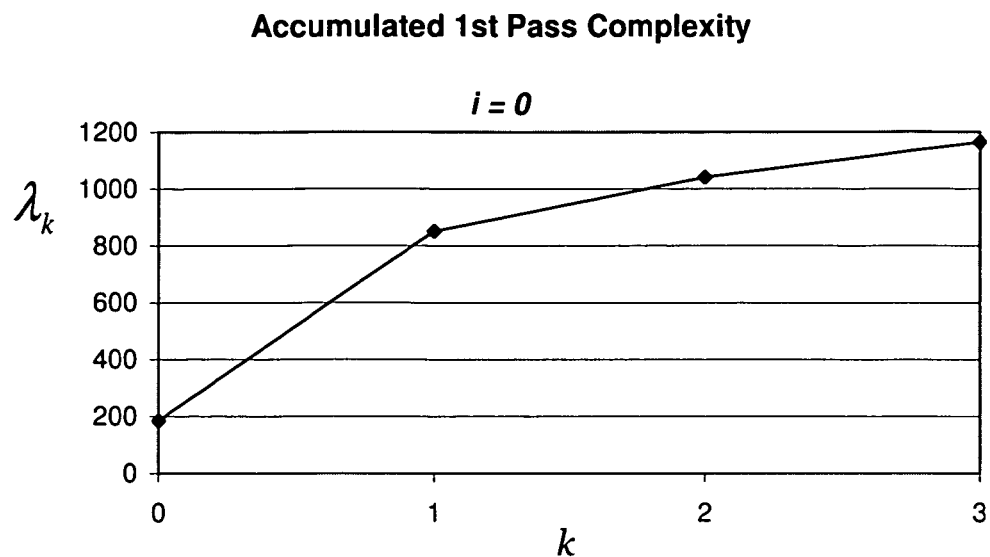
FIG. 7 is a series of graphs showing the relationship between accumulated 1st pass complexity and mapped accumulated 2nd pass complexity.
Figure 7B:
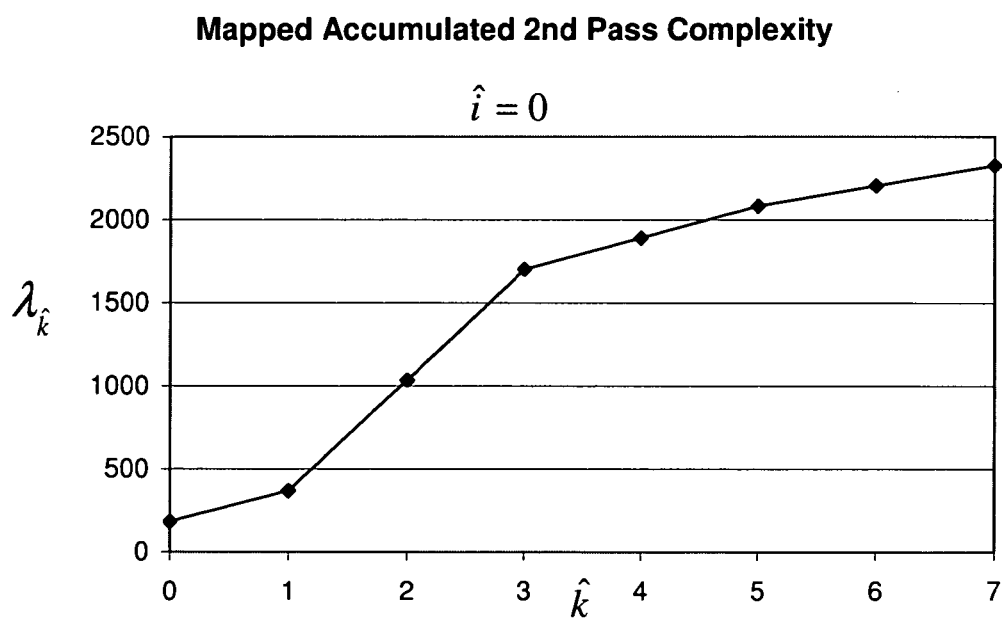
Figure 7C:
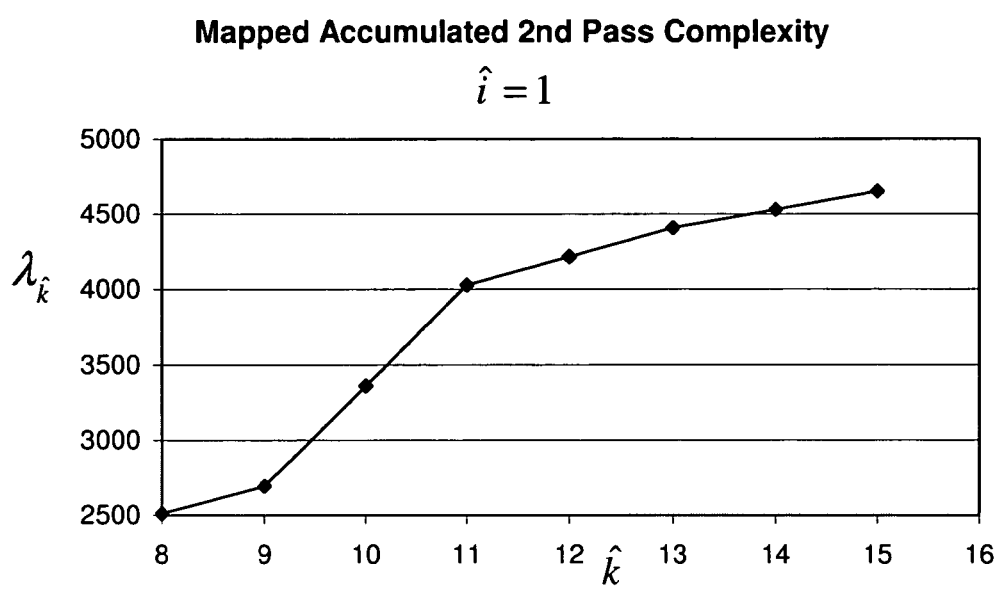

FIG. 7 shows the relationship between the accumulated 1st pass complexity and the mapped accumulated 2nd pass complexity in the above example.

For a picture j, if $T_j$ is the target size for an encoded version of picture j as determined by the picture-level rate control algorithm, then the governing equations for macroblocks k=0, ..., N2-1 are the following, depending upon the picture type:

$$V_k = V_f + a_I\left(\hat{u}_k - T_j\left(\frac{\hat{\gamma}_k}{\hat{\gamma}_{N2}}\right)\right) \quad \text{(Equation 24a)}$$

$$V_k = V_f + a_P\left(\hat{u}_k - T_j\left(\frac{\hat{\gamma}_k}{\hat{\gamma}_{N2}}\right)\right) \quad \text{(Equation 24b)}$$

$$V_k = V_f + a_B\left(\hat{u}_k - T_j\left(\frac{\hat{\gamma}_k}{\hat{\gamma}_{N2}}\right)\right) \quad \text{(Equation 24c)}$$

The quantizer $Q_k$ is calculated by:

$$Q_k = \text{Clip3}\left(0, q^{max}, \frac{q^{max}V_k + \frac{1}{2}|B|}{|B|}\right) \quad \text{(Equation 25)}$$

where:

$$\text{Clip3}(x, y, z) = \begin{cases} x; & z < x \\ y; & z > y \\ z; & \text{otherwise} \end{cases} \quad \text{(Equation 26)}$$

By definition, $V_f$ is a copy of $B_{i,u}$ which is an estimation of encoder buffer fullness given by Equation 6 because the true value of encoder buffer fullness is not immediately available due to the pipeline delay. The MB level algorithm applies to both sequential (for single processor architecture) and parallel (for multi processor architecture) encoder designs. For sequential rate control, the pipeline delay is zero and $V_f$ is immediately available after encoding of every picture.

It will be appreciated that the invention is not restricted to the particular embodiment that has been described, and that variations may be made therein without departing from the scope of the invention as defined in the appended claims and equivalents thereof. For example, it will be appreciated that the decimation unit and 1st pass encoder of FIG. 2 could be replaced with a 1st pass encoder designed to implement a different, and relatively simple, video coding standard than that implemented by the 2nd pass encoder, such as MPEG 2 and H.264 respectively. In such a case, the picture-level rate control algorithm would need to compensate for the differences in picture complexity caused by the differing coding standards as opposed to the differing resolutions as described above. Alternatively, rather than an encoder receiving an uncompressed video stream, similar architecture and algorithms as those described above could be employed in a transcoding capacity, wherein a single channel transcoder would receive a video stream encoded according to a first encoding standard, the 1st pass encoder of the above embodiments would be replaced with a 1st pass decoder which would decode the encoded input video stream thus generating the complexity information required by the rate control algorithms, and the 2nd pass encoder would encode the decoded video stream according to a second video coding standard, utilizing the complexity information gathered by the decoder in the manner described above.

The invention claimed is:

1. A method of operating a multi-processor video encoder by determining a target size corresponding to a preferred number of bits to be used when creating an encoded version of a picture in a group of sequential pictures making up a video sequence, the method comprising:
    a) calculating a first degree of fullness of a coded picture buffer at a first time,
    b) operating on said first degree of fullness to return an estimated second degree of fullness of said coded picture buffer at a second time, and
    c) operating on said second degree of fullness to return an initial target size for said picture,
    wherein said first time corresponds to the most recent time an accurate degree of fullness of said coded picture buffer can be calculated and said second time occurs after said first time;
    further comprising, prior to step c, creating a modified version of said picture by decimating said picture, and measuring a first degree of complexity of said picture using said modified version,
    and wherein step c further comprises operating on said first degree of complexity to return said initial target size for said picture.

2. A method according to claim 1, further comprising, subsequently to step c, selecting as the target size for said picture the larger of said initial target size or a minimum acceptable size.

3. A method according to claim 2, wherein said picture is of one of a plurality of picture types and said minimum acceptable size is a function of a bit rate used to transmit pictures of the same picture type as said picture.

4. A method according to claim 1, wherein the method further comprises, prior to step c, calculating a mismatch term, said mismatch term corresponding to an average difference between previously calculated target sizes calculated for a plurality of previously encoded pictures and an actual encoded size for said plurality of previously encoded pictures, and step c further comprises operating on said mismatch term to return said initial target size for said picture.

5. A method according to claim 1, further comprising encoding said picture using said preferred number of bits to select an optimum quantization parameter and using said optimum quantization parameter to control the size, in bits, of an encoded version of said picture.

* * * * *